(12) United States Patent
Shi (10) Patent No.: US 10,264,643 B1
(45) Date of Patent: Apr. 16, 2019

(54) DUAL OVER-CURRENT PROTECTION FOR PHASE CUT DIMMER

(71) Applicant: Leviton Manufacturing Co., Inc., Melville, NY (US)

(72) Inventor: Wen Shi, Wilsonville, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/975,142

(22) Filed: May 9, 2018

(51) Int. Cl.
*H05B 37/02* (2006.01)
*H05B 33/08* (2006.01)

(52) U.S. Cl.
CPC ..... *H05B 33/0845* (2013.01); *H05B 33/0818* (2013.01); *H05B 33/0884* (2013.01)

(58) Field of Classification Search
CPC ............ H05B 33/0845; H05B 33/0884; H05B 33/0818
USPC ........................................................ 315/291
See application file for complete search history.

(56) References Cited

U.S. PATENT DOCUMENTS

| | | |
|---|---|---|
| 3,873,882 A | 3/1975 | Gershen |
| 4,396,869 A | 8/1983 | Rosenbaum et al. |
| 4,429,339 A | 1/1984 | Jaeschke et al. |
| 4,528,494 A | 7/1985 | Bloomer |
| 4,876,498 A | 10/1989 | Luchaco et al. |
| 4,954,768 A | 9/1990 | Luchaco et al. |
| 5,004,969 A | 4/1991 | Schanin |
| 5,336,979 A | 8/1994 | Watson et al. |
| 5,383,084 A | 1/1995 | Gershen et al. |
| 5,424,618 A | 6/1995 | Bertenshaw et al. |
| 5,485,058 A | 1/1996 | Watson et al. |
| 5,499,155 A | 3/1996 | Gershen et al. |
| 5,600,233 A * | 2/1997 | Warren .................... G05F 1/66 323/237 |
| 5,621,283 A | 4/1997 | Watson et al. |
| 5,684,376 A | 11/1997 | Neiger et al. |
| 5,729,421 A | 3/1998 | Gershen et al. |
| 5,789,894 A | 8/1998 | Neiger et al. |
| 5,933,341 A | 8/1999 | Kuriyama et al. |
| 6,175,220 B1 | 1/2001 | Billig et al. |
| 6,347,028 B1 | 2/2002 | Hausman, Jr. et al. |
| 6,380,692 B1 | 4/2002 | Newman, Jr. et al. |
| 6,486,616 B1 | 11/2002 | Liu et al. |
| 6,969,959 B2 | 11/2005 | Black et al. |
| 7,005,762 B2 | 2/2006 | Black et al. |
| 7,242,563 B2 | 7/2007 | Hua et al. |
| 7,482,758 B2 | 1/2009 | Hua et al. |
| 8,324,761 B2 | 12/2012 | Elliott et al. |
| 8,664,881 B2 | 3/2014 | Newman, Jr. et al. |
| 8,698,408 B2 | 4/2014 | Newman, Jr. |
| 8,729,814 B2 | 5/2014 | Salvestrini |

(Continued)

*Primary Examiner* — Daniel D Chang (57) ABSTRACT

An improved apparatus, system, and method for providing over-current protection for a phase cut dimmer or dimming system are disclosed. The apparatus, system, and method provide fast over-current protection by disabling a drive signal for the phase cut dimmer based on a sensed current exceeding a fast-over-current protection threshold. The apparatus, system, and method also provides slow-over-current protection by disabling the drive signal for the phase cut dimmer based on a time-averaged value of the sensed current exceeding a second threshold. As a result, over-current protection can be provided for a variety of different types of loads coupled to the phase cut dimmer.

20 Claims, 4 Drawing Sheets

(56) References Cited

U.S. PATENT DOCUMENTS

| | | | |
|---|---|---|---|
| 8,755,944 | B2 | 6/2014 | Elliott et al. |
| 8,957,662 | B2 | 2/2015 | Newman, Jr. et al. |
| 8,970,128 | B2 | 3/2015 | Newman, Jr. |
| 8,987,994 | B2 | 3/2015 | Newman, Jr. |
| 8,988,050 | B2 | 3/2015 | Newman, Jr. et al. |
| 9,160,224 | B2 | 10/2015 | Newman, Jr. et al. |
| 2001/0014949 | A1 | 8/2001 | Leblanc |
| 2012/0299500 | A1* | 11/2012 | Sadwick .......... H05B 33/0815 315/224 |

* cited by examiner

DUAL OVER-CURRENT PROTECTION FOR PHASE CUT DIMMER

FIELD OF THE DISCLOSURE

The present disclosure relates generally to phase cut dimmers, and more particularly to improved over-current protection for phase cut dimmers.

BACKGROUND OF THE DISCLOSURE

Phase cut dimming is a popular technique for providing dimming control for lighting systems. Conventional phase cut dimmers generally include over-current protection to protect against current overload conditions. Current over-current protection provided by conventional phase cut dimmers, however, is typically inflexible and does not provide suitable protection for a variety of different types of lighting loads.

Generally, to provide over-current protection, many conventional phase cut dimmers measure a current provided to the lighting load and compare it to a single, static threshold. When the measured current exceeds the threshold, over-current protection is applied. As a result, over-current protection can be triggered when the threshold is set too low for a lighting load that frequently draws relatively high peak currents during normal operation, such as, for example, a light emitting diode (LED) load. Relatedly, inadequate over-current protection can result when the threshold is set too high for a lighting load that draws relatively low peak currents during an over-current event, such as, for example, an incandescent load.

Accordingly, it would be advantageous to provide improved over-current protection for phase cut dimmers to support different types of lighting loads. It is with these considerations that the present disclosure is put forth.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein are an apparatus, system, and method for providing dual over-current protection for a phase cut dimmer. In one embodiment, a phase cut dimmer or dimmer system may include a power and sense circuit component or power circuit component (power and sense circuit component and power circuit component used interchangeably without the intent to limit) having an output coupled to a load and a power device drive circuit component configured to generate a drive pulse signal for controlling the power circuit component. The phase cut dimmer may further include a first over-current protection circuit component configured to disable the drive pulse signal based on a sensed current provided by the power circuit component exceeding a first threshold and a second over-current protection circuit component configured to disable the drive pulse signal based on a time-averaged value of the sensed current exceeding a second threshold.

In another embodiment, a method for providing dual over-current protection for a phase cut dimmer may include sensing a current flowing through a power circuit component of the phase cut dimmer, comparing the sensed current to a first threshold, and turning OFF the power circuit component when the sensed current exceeds the first threshold. The method may further include comparing a time-averaged value of the sensed current to a second threshold and turning OFF the power circuit component when the time-averaged value of the sensed current exceeds the second threshold.

BRIEF DESCRIPTION OF THE DRAWINGS

By way of example, a specific embodiment of the disclosed device will now be described, with reference to the accompanying drawings, in which.

DETAILED DESCRIPTION

Embodiments of an improved apparatus, system, and method for providing over-current protection for a phase cut dimmer or dimmer system in accordance with the present disclosure will now be described more fully hereinafter with reference to the accompanying drawings, in which preferred embodiments of the present disclosure are presented. It should be understood however that the apparatus, system, and method of the present disclosure may be embodied in many different forms and should not be construed as being limited to the embodiments set forth herein. Rather, these embodiments are provided so that this disclosure will convey certain example aspects of the system and method to those skilled in the art. In the drawings, like numbers refer to like elements throughout unless otherwise noted.

Figure 1:
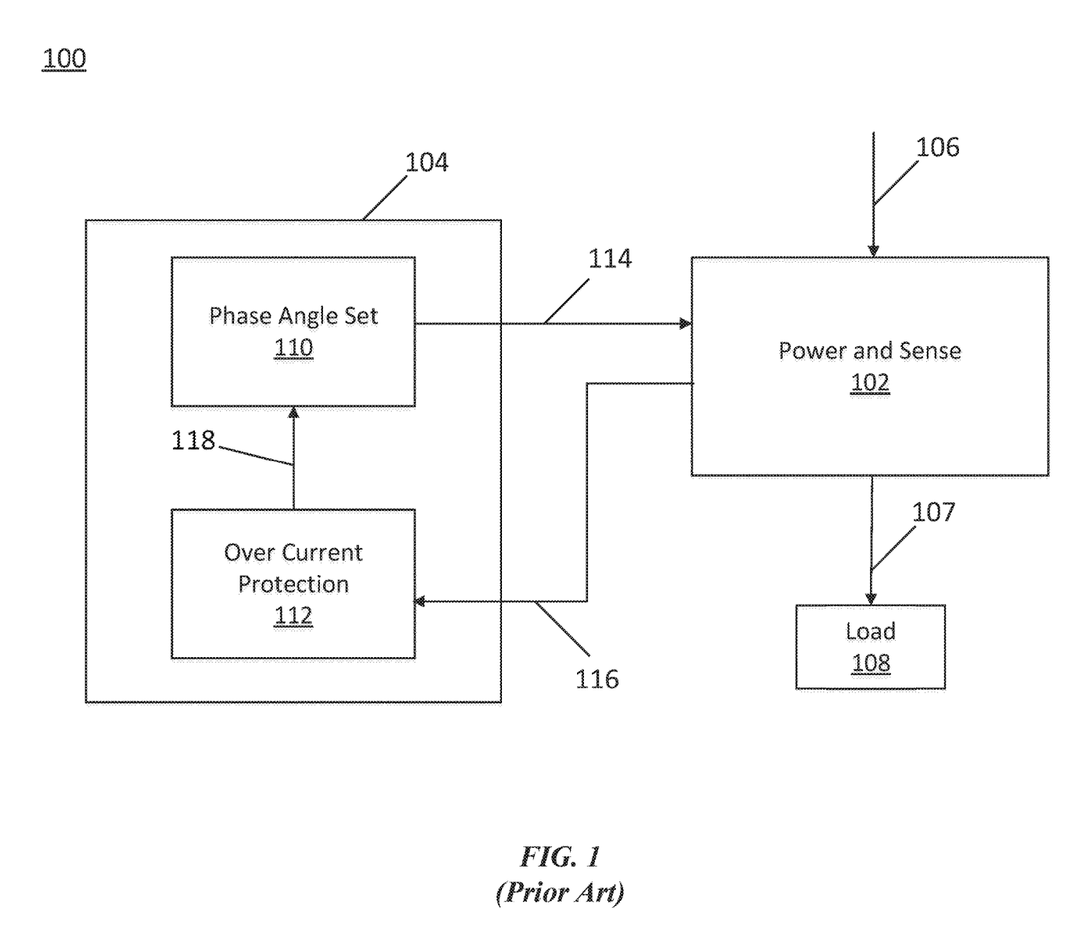
FIG. 1 is a schematic diagram of a conventional, known phase cut dimmer with over-current protection.

Referring to FIG. 1, an example embodiment of a conventional phase cut dimmer circuit or system (used interchangeably without the intent to limit) with over-current protection 100 is illustrated. A description of the conventional phase cut dimmer circuit with over-current protection 100 will be described to provide a basis for the present disclosure.

Phase cut dimming is a common technique for controlling the dimming level or setting of a load such as, for example, a lighting load. To dim the lighting load, a phase cut dimmer cuts off a portion of an input alternating current (AC) waveform and provides the remaining portion of the waveform to the lighting load. The dimming level of the lighting load is adjusted by varying the cut off portion of the waveform relative to the remaining portion of the waveform that is provided to the lighting load. Phase cut dimmers may include "over-current protection" (OCP) to protect against operational conditions that could damage the lighting load or the phase cut dimmer itself, such as, for example, overloading conditions or short circuits.

As shown in FIG. 1, the conventional phase cut dimmer system 100 can include a power and sense circuit or component (circuit and/or component used interchangeably without the intent to limit) 102 and a control unit or component 104. The power and sense circuit 102 can be coupled to an AC line or a neutral line 106 and can be coupled to a lighting load 108. In use, the power and sense circuit 102 can be used to detect, sense, and/or measure the current passing through the phase cut dimmer system 100 and/or the current that is passed to the load 108.

The control unit 104 can include a phase angle set circuit or component 110 and an over-current protection circuit or component 112. The phase angle set circuit 110 can generate and provide a drive pulse signal 114 to the power and sense circuit 102. The drive pulse signal 114 can determine the timing of when electrical power devices of the power and sense circuit 102 are turned OFF and turned ON. In use, the electrical power devices may be, for example, one or more switches, power switching devices, or the like for handling high load currents and for turning ON and OFF rapidly to supply and/or terminate the supply of current. By adjusting the timing of when the electrical power devices of the power and sense circuit 102 are turned OFF and turned ON, a dimming setting of the load 108 can be adjusted. In use, the over-current protection circuit 112 can receive a current sense signal 116 from the power and sense circuit 102 to detect over-current events.

During operation of the phase cut dimmer system 100, the drive pulse signal 114 can control the switching of the electrical power devices of the power and sense circuit 102. The electrical power devices can be switched at certain phase angles to control the portion of the AC waveform on the AC line 106 that is delivered to the lighting load 108, thereby determining the dimming level of the lighting load 108. Specifically, the switching of the electrical power devices as determined by the drive signal 114 generates a dimming load waveform or signal 107 (waveform and/or signal used interchangeably without the intent to limit), which is a controlled portion of the AC waveform on the AC line 106 that is provided to the load 108. Current flowing through the power and sense circuit 102 is detected and an indication of the current value or level is provided to the control unit 104 as the current sense signal 116. The over-current protection circuit 112 compares the current sense signal 116 to a threshold. If the threshold is exceeded, then the over-current protection circuit 112 is triggered to generate a disable drive signal 118. The disable drive signal 118 can disable the drive pulse signal 114 and can cause the electrical power devices of the power and sense circuit 102 to be turned OFF, thereby protecting the electrical power devices and the power and sense circuit 102 from damage due to the detected over-current condition. Additionally, by turning OFF the electrical power devices of the power and sense circuit 102, the dimming load signal 107 is disabled and no longer provided to the load 108, thereby protecting the load 108 from damage due to the detected over-current condition.

While the phase cut dimmer system 100 provides an easy implementable solution for providing over-current protection, the over-current protection provided by the phase cut dimmer system 100 has many limitations as explained further herein. As will be readily appreciated by one of ordinary skill in the art, the phase cut dimmer system 100 can be coupled to a variety of different types of loads including, for example, incandescent lighting loads, light emitting diode (LED) lighting loads, electronic low voltage (ELV) lighting loads, magnetic low voltage (MLV) lighting loads, ballasts, and motors. Further, the load coupled to the phase cut dimmer system 100 can be resistive, capacitive, and/or inductive and can have a high-power factor or a low-power factor. The current waveforms for each of these different types of loads can vary significantly. For example, the current waveform of a high-power factor resistive load (e.g., an incandescent lighting load) is generally a portion of a sine waveform while the current waveform of a low-power factor load (e.g., an LED lighting load without power factor correction) can comprise relatively narrow and high pulses.

Due to the variations in the characteristics of the types of loads that can be coupled to the phase cut dimmer system 100, the current waveforms for the different lighting loads can have very different peak current values under similar load conditions. For example, the peak current for a 2.5 ampere (A) root mean square (RMS) incandescent light load is approximately 3.5 A while the peak current of a 2.5 A RMS low-power factor LED lighting load could exceed 20 A. Setting a single threshold to trigger over-current protection can limit the provided protection for different loads due to the relatively large differences in the peak current values for the different loads.

As an example, setting the threshold to trigger protection at 150% of a rated load current can provide adequate over-current protection for an incandescent load. However, using the same threshold setting can unnecessarily trigger over-current protection at only 25% of the rated load current when the load is a low-power factor LED load. Similarly, if the threshold is set significantly higher to avoid triggering over-current protection for a normally operating LED lighting load, then over-current protection may not be triggered for an overload condition of 150% of the rated load current when the load is an incandescent lamp.

Figure 2:
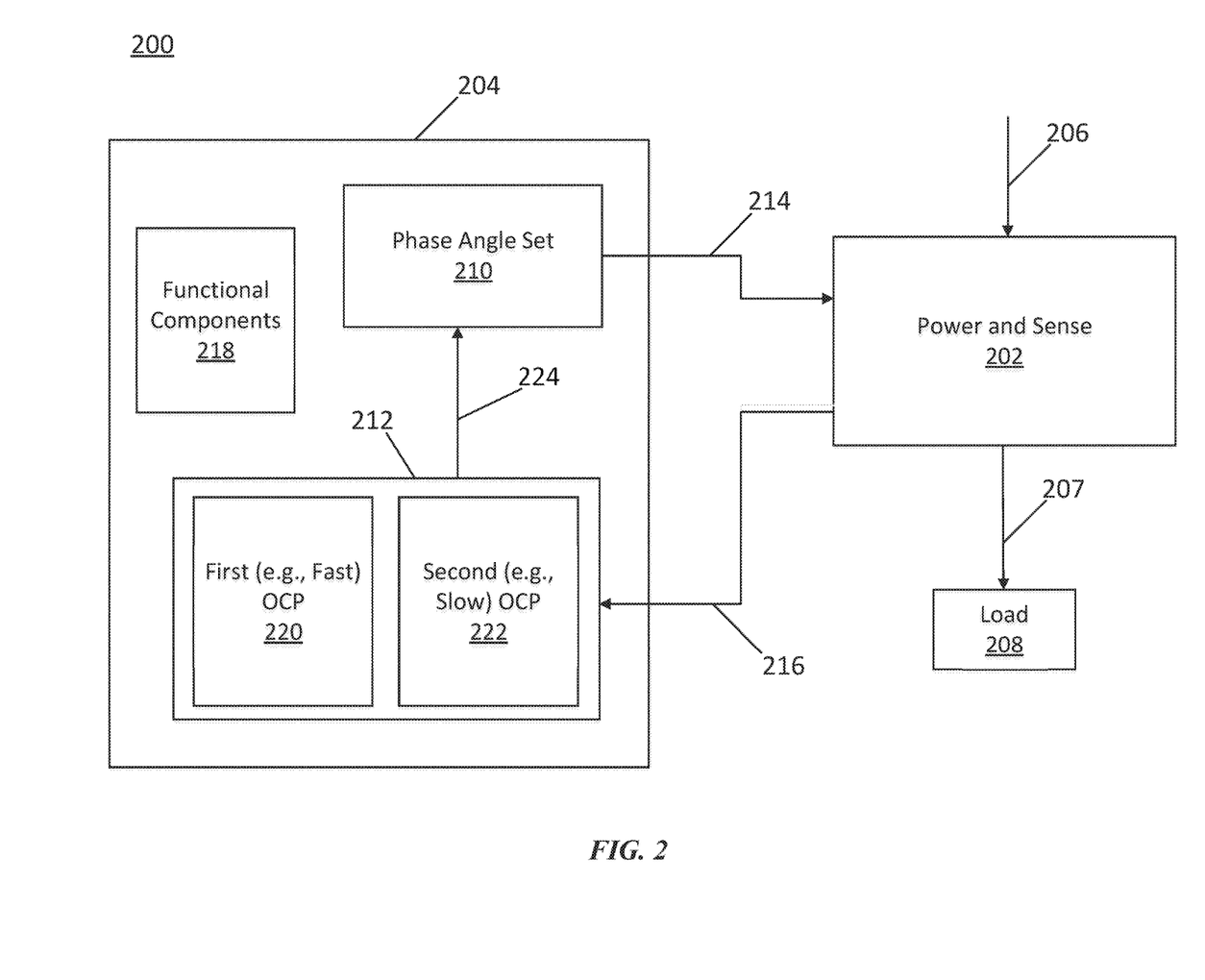
FIG. 2 is a first schematic diagram of an example embodiment of a phase cut dimming system with enhanced over-current protection according to the present disclosure.

Turning now to the present invention and referring to FIG. 2, a simplified phase cut dimming system with enhanced over-current protection 200 according to one example embodiment of the present disclosure is illustrated. That is, in contrast with the conventional phase cut dimmer circuit with over-current protection 100 described and illustrated with reference to FIG. 1, the phase cut dimming system 200 illustrated with reference to FIG. 2 provides dual over-current protection by detecting and responding to operational conditions for loads that draw relatively low peak currents and for loads that draw relatively high peak currents. As a result, the phase cut dimming system 200 provides improved over-current protection while being compatible with a variety of different types of loads.

As shown in FIG. 2, the phase cut dimmer system 200 can include a power and sense circuit or component 202 and a control unit or component 204. An input of the power and sense circuit 102 can be coupled to an electrical line 206 such as, for example, and AC line or a neutral line. An output 207 of the power and sense circuit 204 can be coupled to a load 208. The load 208 can be any type of load such as, for example, a lighting load such as, for example, an incandescent lighting load, an LED lighting load, an ELV lighting load, a MLV lighting load. In some embodiments, the load 108 can be a ballast or a motor or the like.

The control unit 204 can include a phase angle set circuit or component 210 and an over-current protection circuit or component 212. The phase angle set circuit 210 can generate and provide a drive pulse signal 214 to the power and sense circuit 202. The drive pulse signal 214 sets the timing of when the electrical power devices (e.g., switches and/or power switching devices) of the power and sense circuit 202 are turned OFF and turned ON to set a dimming level for the load 208, by generating a controlled portion of the AC waveform provided on electrical line 206 for the output 207. The over-current protection circuit 212 can receive a current sense signal 216 from the power and sense circuit 202 to detect over-current events. The control unit 204 can further include other functional units, circuits, or components 218 that can provide a variety of different functions or features such as, for example, communication functions and/or user interface functions.

As illustrated, the over-current protection circuit 212 includes a first over-current protection (OCP) circuit or component 220 and a second OCP circuit or component 222. The first OCP circuit 220 can be considered a fast OCP circuit. The second OCP circuit 222 can be considered a slow OCP circuit. An over-current protection threshold for the fast OCP circuit 220 can be set to a higher over-current protection threshold than for the slow OCP circuit 222. In use, the fast OCP circuit 220 protects the phase cut dimming system 200 from relatively high peak currents applied over a short period of time. The slow OCP circuit 222 protects the phase cut dimming system 200 from relatively lower peak currents applied to the load 208 over relatively longer periods of time. Accordingly, in one embodiment, over-current protection for incandescent lamp loads can be provided by the slow OCP circuit 222 and over-current protection for LED loads can be provided by the fast OCP circuit 220.

Either the fast OCP circuit 220 or the slow OCP circuit 222 can generate a disable drive signal 224 to disable the drive pulse signal 214 based on a detected over-current condition. When the drive pulse signal 214 is disabled, the electrical power devices of the power and sense circuit 202 can be turned OFF, thereby protecting the electrical power devices and the power and sense circuit 202 from damage due to the detected over-current condition. Additionally, by turning OFF the electrical power devices of the power and sense circuit 202, the output 207 can be disabled and not provided to the load 208, thereby protecting the load 208 from the detected over-current condition.

Figure 3:
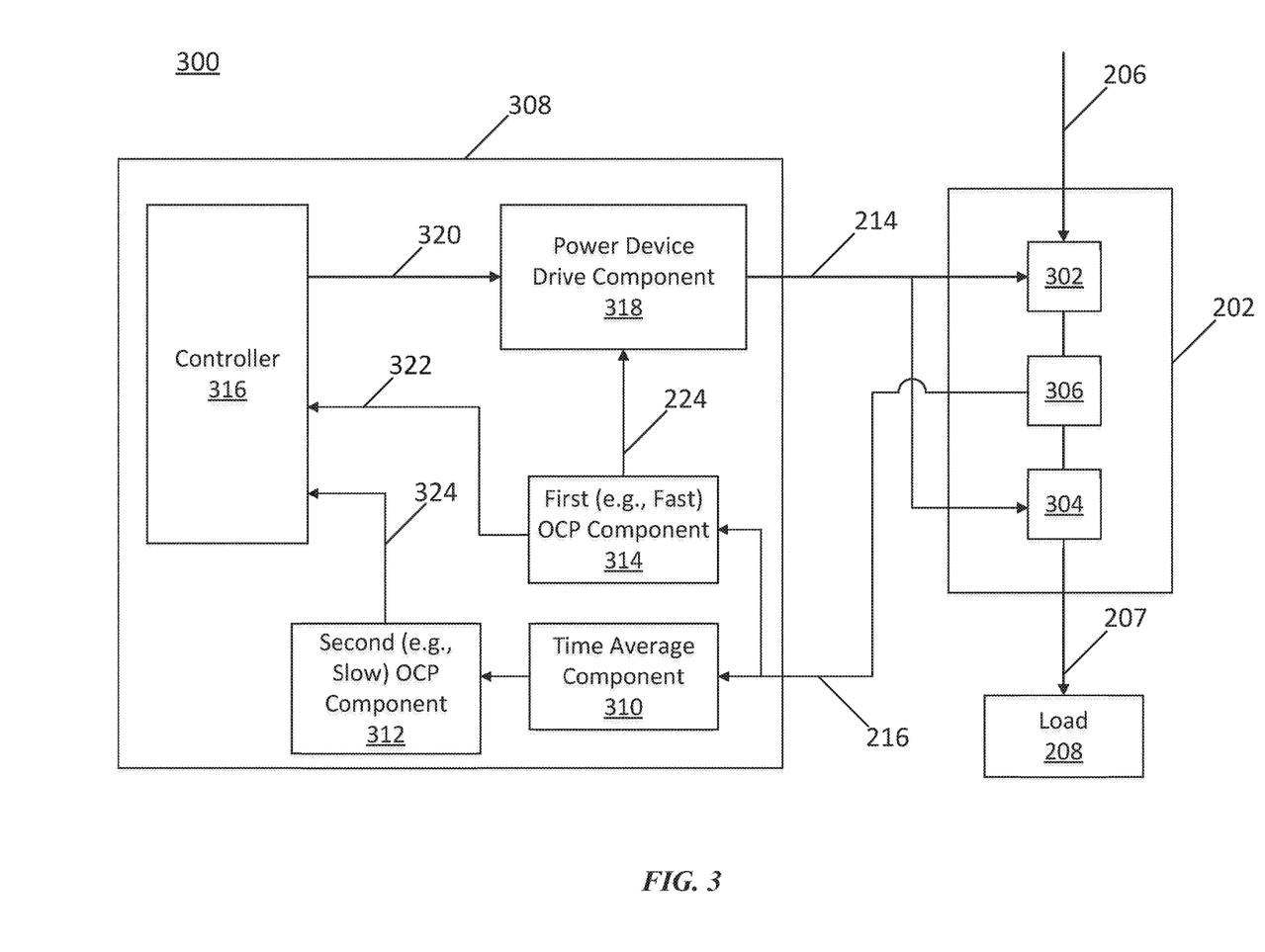
FIG. 3 is a second schematic diagram of an example embodiment of a phase cut dimming system with enhanced over-current protection according to the present disclosure.

Referring to FIG. 3, a more detailed version of a phase cut dimming system with enhanced over-current protection 300 is illustrated. The phase cut dimming system 300 can represent a particular implementation of the phase cut dimming system 200. The phase cut dimming system 300 can provide the same over-current protection capabilities described above in relation to the phase cut dimming system 200.

As shown, the power and sense circuit 202 can include first and second electrical power devices 302, 304. The first and second electrical power devices 302, 304 can be, for example, one or more switches, power switching devices, or the like for handling high load currents and for turning ON and OFF rapidly to supply and/or terminate the supply of current to the load 208 from the output 207. For example, in one embodiment, the electrical power devices 302, 304 may be power switching devices such as, for example, power transistors, triodes for alternating current (TRIACs), silicon controlled rectifiers (SCRs), metal-oxide-semiconductor field-effect transistors (MOSFETs), or insulated-gate bipolar transistors (IGBTs). In use, the first and second electrical power devices 302, 304 can be coupled between an input of the power and sense circuit 202 (e.g., coupled to the electrical input line 206) and the output 207 of the power and sense circuit 202 (e.g., coupled to the load 208). In some embodiments, the power and sense circuit 202 can include a single electrical power device (e.g., electrical power device 302 or 304).

The power and sense circuit 202 can further include a current sensing device or component 306. The current sensing component 306 can detect or determine a value (e.g., magnitude) of a current flowing through the power and sense circuit 202 (and/or flowing through the first and second electrical power devices 302, 304 and/or provided to the load 208 through the output 207). The current sensing component 306 can generate the current sense signal 216 to include an indication of the value or level of the sensed current.

The phase cut dimming system 300 can further include a control unit or component 308. The control unit 308 can represent a particular implementation of the control unit 204. The control unit 308 can include a time average circuit or component 310, a slow OCP circuit or component 312, and a fast OCP circuit or component 314. The control unit 308 can further include a controller 316 and a power device drive circuit or component 318. In some embodiments, the fast OCP component 314 corresponds to the fast OCP circuit 220 while the time average component 310 and the slow COP component 312 correspond to the slow OCP circuit 222. In some embodiments, the control unit 308 can be coupled to and/or can provide features related to one or more input devices, one or more output devices, a user interface (e.g., for setting a dimming level of the load 208), and/or one or more communication devices.

During normal operation of the phase cut dimming system 300—for example, when an over-current event is not occurring and/or detected—the controller 316 can generate a control signal 320 that is provided to the power device drive component 318. The control signal 320 can indicate a desired dimming setting or level for the load 208. The power device drive component 318 can generate the drive pulse signal 214 based on the control signal 320. The drive pulse signal 214 can be provided to the first and second electrical power devices 302, 304 and can control when the first and second electrical power devices 302, 304 are turned ON and OFF to establish the desired dimming level for the load 208 (e.g., corresponding to the dimming level specified by the control signal 320). The desired dimming level for the load 208 can be provided by the output 207 as a controlled portion of the AC signal provided by the electrical line 206. As the first and second electrical power devices 302, 304 are controlled, the current sensing component 306 detects the current flowing through the power and sense circuit 202. The current sensing component 306 generates and provides the current sense signal 216 to the control unit 308 that indicates a value or level of the detected current.

In use, the slow OCP component 312 can operate based on a predetermined or configurable slow OCP threshold and the fast OCP component 314 can operate based on a predetermined or configurable fast OCP threshold. If the current sense signal 216 exceeds the fast OCP threshold, then the fast OCP component 314 is triggered. When triggered, the fast OCP component 314 immediately generates the disable drive signal 224 to immediately stop the power device drive component 318 from generating and providing the drive pulse signal 214 to the power and sense signal 202, which causes the first and second electrical power devices 302, 304 to immediately cease or stop providing current to, for example, the load 208 (e.g., the output 207 can be disabled).

As shown in FIG. 3, the disable drive signal 224 is directly transmitted to the power device drive component 318, even though the controller 316 may still be providing the control signal 320 to the power device drive component 318. Directly routing the disable drive signal 224 to the power device drive component 318 enables the first and second electrical power devices 302, 304 to be turned OFF quicker in response to a detected fast OCP event. In doing so, protection for the power and sense circuit 202 is improved as the response to a detected fast OCP event is quicker, thereby increasing the likelihood that the power and sense circuit 202 and any components thereof survive a fast OCP event. A fast OCP event can include, for example, a short circuit at the output of the power and sense circuit 202. As further shown, the fast OCP component 314 can also generate and provide a fault report 322 to the controller 316. The fault report 322 can include information regarding the detected fast OCP event and the response thereto.

As will be readily appreciated by one of ordinary skill in the art, each of the first and second electrical power devices 302, 304 (e.g., implemented as MOSFETs) have a "safe operation area" (SOA). The SOA defines the ability of the first and second electrical power devices 302, 304 to handle extreme voltage and/or current conditions for certain periods of time. Accordingly, operating the first and second electrical power devices 302, 304 outside of their respective SOAs can result in damage to the first and second electrical power devices 302, 304.

In view of the range of acceptable operation of the first and second electrical power devices 302, 304—for example, as defined by the SOA for each device—techniques for fast OCP protection provided by the phase cut dimming system 300 enables protection to be applied to the power and sense circuit 202 within a very short period of time relative to the detection of a fast OCP event. In some embodiments, the response of the phase cut dimming system 300 to a detected fast OCP event can be on the order of a few hundred nanoseconds to a few microseconds. This quick response time can increase the likelihood that the first and second electrical power devices 302, 304 do not operate outside of their respective SOAs, even when a short circuit occurs or a high magnitude overload fault occurs. In some embodiments, the fast OCP threshold can be set at a value lower than the rated current of the first and second electrical power devices 302, 304 to ensure the first and second electrical power devices 302, 304 always operate within their respective SOAs.

In use, to provide slow OCP, as shown in FIG. 3, the current sense signal 216 is provided to the time average component 310. The current sense signal 216 can be an instantaneous value of the current flowing through the power and sense circuit 202. The time average component 310 can provide an average value for the sensed current (e.g., a time-average value). The time-averaged value can be any suitable average value including, for example, a mean value, a partial mean value, a weighted mean value, a RMS value, a partial RMS value, or a weighted RMS value of the detected instantaneous current. Accordingly, in some embodiments, the time average component 310 can be an electronic circuit that implements a time averaging function such as, for example, a low pass frequency filter or an integrated circuit.

An output of the time average component 310 can be a time-averaged value of the sense current that is compared to the slow OCP threshold by the slow OCP component 312. When the time-averaged value of the current exceeds the slow OCP threshold, then the slow OCP component 312 can be triggered. When the slow OCP component 312 is triggered, the slow OCP component 312 can generate and provide a fault signal 324 to the controller 316. The controller 316 can respond to the received fault signal 324 by providing an indication in the control signal 320 to shut down and power OFF the power and sense circuit 202 and its components. In response, the power device drive component 318 can disable the drive pulse signal 214.

The slow OCP protection provided by the phase cut dimming system 300 prevents a steady-state current overload condition from damaging the power and sense circuit 202 that may not correspond to a peak overload current value that exceeds the fast OCP threshold to cause the fast OCP component 314 to be triggered. As a result, a long time steady-state current overload condition can be detected and avoided to prevent damage to the power and sense circuit 202 or its constituent components such as, for example, from a high-temperature situation caused by the current over load or the like. In some embodiments, the slow OCP threshold can be selected to ensure that the heat generated by the first and second electrical power devices 302, 304, printed circuit board (PCB) traces, electrical connectors, and/or any other electrical component of the power and sense circuit 202 and/or the load 208 does not exceed a predetermined safe limit.

As will be readily appreciated by one of ordinary skill in the art, the phase cut dimming systems 200 and 300 each provide fast and slow over-current monitoring and protection simultaneously.

Figure 4:
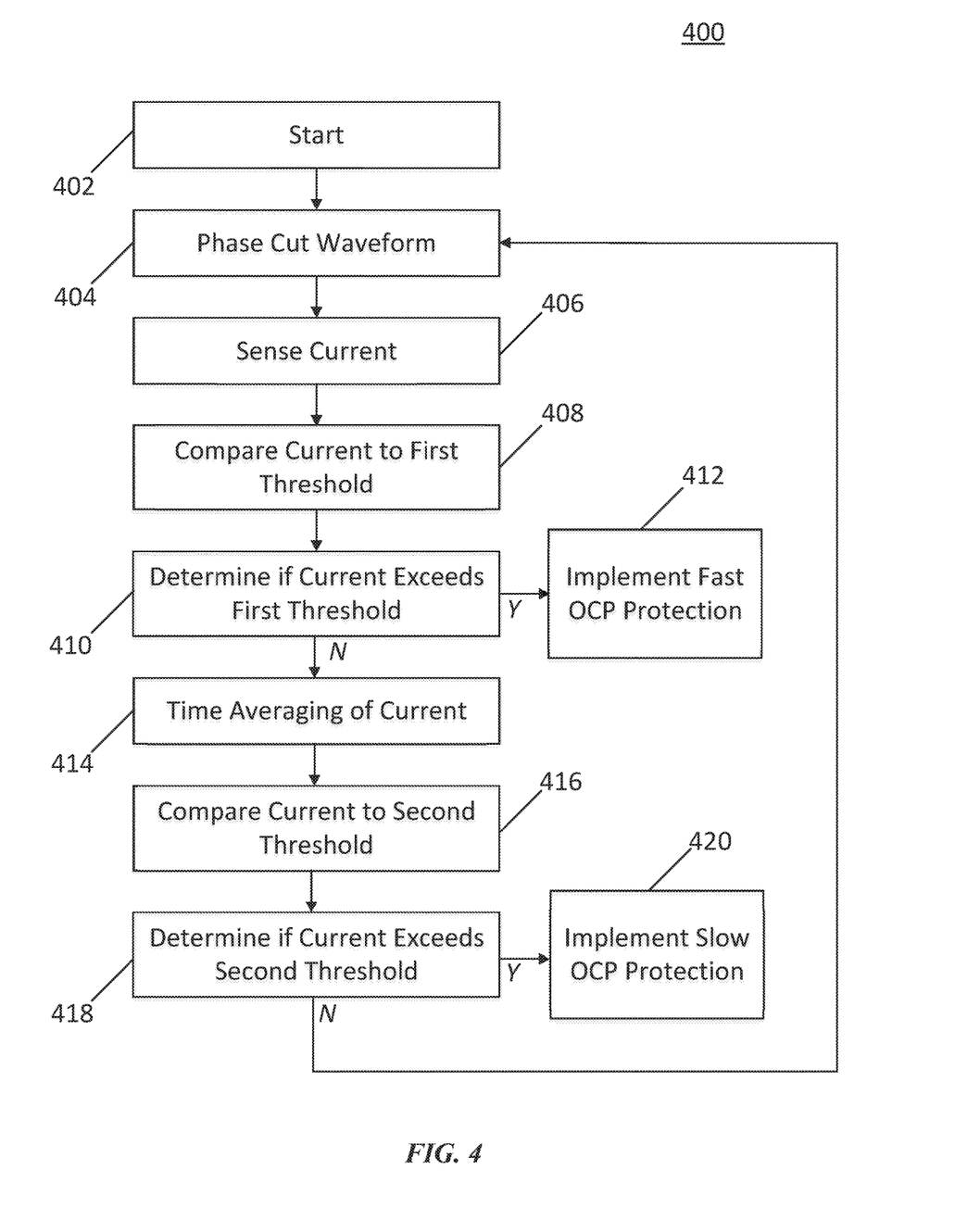
FIG. 4 is a schematic diagram of an example embodiment of a method for providing dual over-current protection for a phase cut dimmer.

Referring to FIG. 4, an example embodiment of a method for providing dual over-current protection within a phase cut dimmer or dimming system 400 is illustrated. The method shown in FIG. 4 can be implemented by the phase cut dimming systems 200 and 300 described herein.

At 402, the method 400 can begin. At 404, phase cutting of a waveform occurs. The waveform can be an AC line waveform or a neutral line waveform or the like that is coupled to a load such as, for example, a lighting load. The phase cutting of the waveform can adjust a dimming setting of the lighting load.

At 406, a current coupled to the lighting load can be sensed. The current can flow through a phase cut dimmer, or a component thereof, coupled to the lighting load. A measure of the current (e.g., magnitude) can be determined at 406. The measured value of the sensed current can be an instantaneous value of the current.

At 408, the measured value of the current can be compared to a first threshold. The first threshold can be a fast OCP threshold. The first threshold can be a first peak limit value.

At 410, a determination can be made as to whether the measured value of the current exceeds the first threshold. If the measured value of the current exceeds the first threshold, then at 412 a fast OCP can be triggered. As part of the fast OCP protection provided at 412, electrical power devices of the phase cut dimmer or dimming system can be turned OFF directly along with the phase cut dimmer itself or any components thereof.

If the measured value of the current does not exceed the first threshold, then at 414 a time-averaging of the sensed current can occur. The time-averaging of the sensed current can include generating a mean value, a partial mean value, a weighted mean value, a RMS value, a partial RMS value, or a weighted RMS value of the sensed instantaneous current.

At 416, the time-averaged value of the sensed current can be compared to a second threshold. The second threshold can be a slow OCP threshold. The second threshold can be a second peak limit value. The second peak limit value can be lower or smaller than the first peak limit value.

At 418, a determination can be made as to whether the time-average value of the sensed current exceeds the second threshold. If the time-average value of the sensed current exceeds the second threshold, then at 420 a slow OCP can be triggered. As part of the slow OCP protection provided at 420, a signal can be sent to a controller that generates drive signals for the electrical power devices of the phase cut dimmer or dimming system. The signal can cause the controller to disable the drive signals to provide protection to the electrical power devices of the phase cut dimmer or dimming system or any other components thereof.

If the time-average value of the sensed current does not exceed the second threshold, then 404-420 can be repeated as shown to ensure fast and slow OCP monitoring and protection is being provided simultaneously as the phase cut dimmer operates normally to adjust a dimming level of the attached load.

The techniques described herein for providing dual over-current protection with a phase cut dimmer can be implemented in hardware, software, or any combination thereof. For example, the phase cut dimming systems 200 and 300, including any constituent component thereof, and the method 400, can be implemented in hardware, software, or any combination thereof. Software related implementations of the techniques described herein can include, but are not limited to, firmware, application specific software, or any other type of computer readable instructions that can be executed by one or more processors. Hardware related implementations of the techniques described herein can include, but are not limited to, integrated circuits (ICs), application specific ICs (ASICs), field programmable arrays (FPGAs), and/or programmable logic devices (PLDs). In some embodiments, the techniques described herein and/or any system or constituent component described herein can be implemented with a processor executing computer readable instructions stored on one or more memory components.

Some embodiments of the disclosed device may be implemented, for example, using a storage medium, a computer-readable medium or an article of manufacture which may store an instruction or a set of instructions that, if executed by a machine (i.e., processor or microcontroller), may cause the machine to perform a method and/or operation in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain example embodiments of the disclosure have been described herein, it is not intended that the disclosure be limited to the specific embodiments described herein. For example, while certain example embodiments have been described as containing certain features, circuitry, and/or functionality, one of ordinary skill in the art will appreciate that features, circuitry, and/or functionality can be interchangeable amongst the various disclosed embodiments. Therefore, the above description should not be construed as limiting, but merely as exemplifications of particular embodiments. Those skilled in the art will envision additional modifications, features, and advantages within the scope and spirit of the claims appended hereto.

What is claimed is:

1. A phase cut dimmer, comprising:
a power circuit component having an output coupled to a load;
a power device drive circuit component configured to generate a drive pulse signal for controlling the power circuit component;
a first over-current protection circuit component configured to disable the drive pulse signal based on a sensed current provided by the power circuit component exceeding a first threshold; and
a second over-current protection circuit component configured to disable the drive pulse signal based on a time-averaged value of the sensed current exceeding a second threshold,
wherein the sensed current is available simultaneously to the first and second over-current protection circuit components.

2. The phase cut dimmer of claim 1, wherein a value of the first threshold is larger than a value of the second threshold.

3. The phase cut dimmer of claim 1, wherein the sensed current comprises an instantaneous value of a current flowing through the power circuit component.

4. The phase cut dimmer of claim 3, wherein the second over-current protection circuit component comprises a time average circuit component configured to generate the time-averaged value of the sensed current.

5. The phase cut dimmer of claim 4, wherein the time-averaged value of the sensed current comprises one of a mean value, a partial mean value, a weighted mean value, a root mean square (RMS) value, a partial RMS value, and a weighted RMS value of the instantaneous value of the current flowing through the power circuit component.

6. The phase cut dimmer of claim 1, the power circuit component having an input coupled to an alternating current (AC) line.

7. The phase cut dimmer of claim 6, the power circuit component comprising at least one electrical power device coupled between the AC line and the load, wherein the drive pulse signal controls the timing of turning ON and turning OFF the at least one electrical power device to adjust a dimming setting of the load.

8. The phase cut dimmer of claim 7, wherein the at least one electrical power device comprises one of a power transistor, a triode for alternating current (TRIAC), a silicon controlled rectifier (SCR), a metal-oxide-semiconductor field-effect transistor (MOSFET), and an insulated-gate bipolar transistor (IGBT).

9. The phase cut dimmer of claim 1, wherein the first over-current protection circuit component generates and provides a disable drive signal directly to the power device drive circuit component when the sensed current exceeds the first threshold to disable the drive pulse signal.

10. The phase cut dimmer of claim 9, further comprising a control unit configured to control operation of the power device drive circuit.

11. The phase cut dimmer of claim 10, wherein the second over-current protection circuit component generates and provides a fault signal to the control unit when the time-averaged value of the sensed current exceeds the second threshold, wherein the control unit directs the power device drive circuit to disable the drive pulse signal in response to the fault signal.

12. The phase cut dimmer of claim 1, wherein the load comprises a lighting load.

13. The phase cut dimmer of claim 12, wherein the lighting load comprises one of an incandescent lighting load, a light emitting diode (LED) lighting load, an electronic low voltage (ELV) lighting load, and a magnetic low voltage (MLV) lighting load.

14. A method for providing dual over-current protection for a phase cut dimmer, comprising:
sensing a current flowing through a power circuit component of the phase cut dimmer;
providing the sensed current simultaneously to a first over-protection circuit and a second over-current protection circuit;
comparing the sensed current to a first threshold with the first over-current protection circuit;
turning OFF the power circuit component when the sensed current exceeds the first threshold;
comparing a time-averaged value of the sensed current to a second threshold with the second over-current protection circuit; and
turning OFF the power circuit component when the time-averaged value of the sensed current exceeds the second threshold.

15. The method of claim 14, further comprising generating the time-averaged value of the sensed current based on one of a mean value, a partial mean value, a weighted mean value, a root mean square (RMS) value, a partial RMS value, and a weighted RMS value of an instantaneous value of the current flowing through the power circuit component.

16. The method of claim 14, further comprising setting the first threshold to be larger than the second threshold.

17. The method of claim 14, further comprising coupling an input of the power circuit component to an alternating current (AC) line and coupling an output of the power circuit component to a load.

18. The method of claim 17, wherein the load comprises one of an incandescent lighting load, a light emitting diode (LED) lighting load, an electronic low voltage (ELV) lighting load, and a magnetic low voltage (MLV) lighting load.

19. The method of claim 14, wherein turning OFF the power circuit component when the sensed current exceeds the first threshold comprises generating and providing a disable drive signal directly to a power device drive circuit component configured to control the power circuit component.

20. The method of claim 19, wherein turning OFF the power circuit component when the time-averaged value of the sensed current exceeds the second threshold comprises generating and providing a fault signal to a controller component, the controller component configured to generate a control signal to the power device drive circuit component directing the power device drive circuit component to turn OFF the power circuit component.

* * * * *